(12) United States Patent
Oveyssi et al.

(10) Patent No.: US 7,085,108 B1
(45) Date of Patent: Aug. 1, 2006

(54) DISK DRIVE INCLUDING PIVOT-BEARING CARTRIDGE TOLERANCE RING HAVING A DAMPING LAYER FOR ACTUATOR RESONANCE REDUCTION

(75) Inventors: Kamran Oveyssi, San Jose, CA (US); Chen-Chi Lin, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 13 days.

(21) Appl. No.: 10/261,435

(22) Filed: Sep. 30, 2002

(51) Int. Cl.
*G11B 5/55* (2006.01)
*G11B 21/08* (2006.01)
*G11B 33/14* (2006.01)

(52) U.S. Cl. .............................. 360/265.2; 360/97.02; 360/265.6

(58) Field of Classification Search ............. 360/265.2, 360/265.6, 97.02
See application file for complete search history.

(56) References Cited

U.S. PATENT DOCUMENTS

| | | | |
|---|---|---|---|
| 5,315,465 A | 5/1994 | Blanks | |
| 5,666,242 A * | 9/1997 | Edwards et al. | 360/265.6 |
| 5,727,882 A * | 3/1998 | Butler et al. | 384/611 |
| 5,761,006 A * | 6/1998 | Sri-Jayantha et al. | 360/265.2 |
| 5,914,837 A * | 6/1999 | Edwards et al. | 360/265.6 |
| 5,930,071 A * | 7/1999 | Back | 360/265.2 |
| 6,163,441 A * | 12/2000 | Wood et al. | 360/266.1 |
| 6,411,472 B1 | 6/2002 | Allsup | |
| 6,480,363 B1 * | 11/2002 | Prater | 360/265.7 |
| 6,618,226 B1 * | 9/2003 | Prater | 360/265.7 |

FOREIGN PATENT DOCUMENTS

JP     10097769 A  *  4/1998

* cited by examiner

*Primary Examiner*—Craig A. Renner
(74) *Attorney, Agent, or Firm*—Alan W. Young, Esq.; Joshua C. Harrison, Esq.

(57) ABSTRACT

A disk drive includes a pivot-bearing cartridge configured to pivotally support the head stack assembly on the base of the drive. A tolerance ring is coupled to the pivot-bearing cartridge and includes a single sleeve defining an inner sleeve surface facing the pivot-bearing cartridge and an outer sleeve surface facing away therefrom, and a layer of dampening material disposed on the inner or outer sleeve surfaces so as to be in contact with the pivot-bearing cartridge or the bore surface of the through bore that is defined in the body portion of the head stack assembly, respectively.

4 Claims, 5 Drawing Sheets

DISK DRIVE INCLUDING PIVOT-BEARING CARTRIDGE TOLERANCE RING HAVING A DAMPING LAYER FOR ACTUATOR RESONANCE REDUCTION

BACKGROUND OF THE INVENTION

1. Field of the Invention

This invention relates to head stack assemblies and to magnetic disk drives. In particular, the present invention relates to head stack assemblies and disk drives including a pivot-bearing cartridge including a damping layer to reduce vibrations in the actuator assembly.

2. Description of the Prior Art and Related Information

As the storage capacity of disk drives increases, the number of tracks per inch (TPI) on which data is stored also increases. As the TPI increases, the importance of the servo bandwidth controlling the head correspondingly increases. As the actuator is controlled to move ever faster, unwanted resonances occur that are detrimental to the operation of the drive. Such actuator resonances transfer to the suspension assembly to which the read/write heads are located, to the pivot-bearing cartridge, as well as to the base and the cover of the drive. Theses vibrations contribute to off-track motion of the read/write heads as they follow the data tracks on the recording surface of the magnetic disk during reading and writing operation.

Although disk drive designers strive to render the actuator assembly as stiff as possible, it is still subject to bending when forces incident to the normal operation of the drive act upon it. In particular, the actuator assembly may exhibit undesirable resonances, such as the so-called butterfly mode resonance (also called the main mechanical system mode or the first principal bending mode of actuator), in which the actuator elastically bends about the pivot-bearing cartridge. In current designs, such butterfly mode resonances may be centered at about 6 Khz. Efforts in reducing the effect of such butterfly mode resonance have centered on increasing the frequency of the butterfly mode resonance by increasing the stiffness of the actuator assembly and decreasing its mass. However, even though the butterfly mode frequency increases, the amplitude of the corresponding resonance peak, as measured on a Bode plot, may still be unacceptably high. Designers have also used a powerful servo notch filters to filter out the butterfly mode resonance frequencies. Another alternative is to use a less powerful servo notch filter and to reduce the amplitude of the butterfly resonance peak by introducing damping into the system. Using damping and a less powerful servo notch filter, however, does not decrease the servo bandwidth as much as using a powerful servo notch filer without damping.

U.S. Pat. No. 6,411,472 discloses a disk drive in which a tolerance ring is interposed between the through bore defined within the head stack assembly and the pivot-bearing cartridge. The tolerance ring in this patent has a laminate structure in which two metal layers sandwich a viscoelastic dampening layer. However, it is believed that manufacturing such a dual metal laminate tolerance is difficult, impractical and expensive. Indeed, during manufacture of the rings, the sheet metal that forms the dual laminate structure is pressed against gears to form the indentations that impart the required cylindrical shape to the tolerance ring. So that the locations of the indentations precisely match on both sheets, the two sheets of metal must be pressed against the gears at the same time. This, however, tends to delaminate the dual metal laminate structure of the tolerance ring. If, however, the sheets are not pressed against the gears at the same time, the resulting indentations on both sheets likely will be offset relative to one another, further promoting delamination of the laminate structure or further difficulties in laminating the dual metal laminate tolerance ring in the first place.

What are needed, therefore, are disk drives and head stack assemblies that incorporate damping to reduce the deleterious effects of unwanted resonances. Such disk drives and head stack assemblies should incorporate such damping in an easily and practically manufacturable manner, and in a manner that is relatively inexpensive.

SUMMARY OF THE INVENTION

This invention can be regarded as a disk drive, comprising a base, a disk, a spindle motor attached to the base for rotating the disk and a head stack assembly pivotally coupled to the base. The head stack assembly includes a body portion, the body portion including a bore surface that defines a through bore, an actuator arm cantilevered from the body portion, a head for reading from and writing to the disk coupled to the actuator arm, a coil cantilevered from the body portion in an opposite direction from the actuator arm, a pivot-bearing cartridge configured to fit within the through bore for pivotally supporting the head stack assembly on the base and a tolerance ring coupled to the pivot-bearing cartridge. The tolerance ring includes a single sleeve defining an inner sleeve surface facing the pivot-bearing cartridge and an outer sleeve surface facing away from the pivot-bearing cartridge, and a layer of dampening material disposed on the inner or outer sleeve surfaces so as to be in contact with the pivot-bearing cartridge or the bore surface, respectively.

According to another embodiment, the invention is also a disk drive, comprising a base, a post extending from the base, a disk, a spindle motor attached to the base for rotating the disk and a head stack assembly. The head stack assembly includes a body portion, the body portion including a bore surface that defines a through bore, an actuator arm cantilevered from the body portion, a head for reading from and writing to the disk coupled to the actuator arm, and a coil cantilevered from the body portion in an opposite direction from the actuator arm. A pivot-bearing cartridge is configured to fit over the post and within the through bore for pivotally supporting the head stack assembly on the base. A tolerance ring is coupled to the pivot-bearing cartridge and to the post. The tolerance ring includes a single sleeve defining an inner sleeve surface facing the post and an outer sleeve surface facing the pivot-bearing cartridge, and a layer of dampening material disposed on the inner or outer sleeve surfaces of the sleeve so as to be in contact with the post or the pivot-bearing cartridge, respectively.

The present invention may also be viewed as a head stack assembly, comprising a body portion, the body portion including a bore surface that defines a through bore, an actuator arm cantilevered from the body portion, a read/write head coupled to the actuator arm, a coil cantilevered from the body portion in an opposite direction from the actuator arm, a pivot-bearing cartridge configured to fit within the through bore for pivotally supporting the head stack assembly and a tolerance ring coupled to the pivot-bearing cartridge. The tolerance ring includes a single sleeve defining an inner sleeve surface facing the pivot-bearing cartridge and an outer sleeve surface facing away from the pivot-bearing cartridge, and a layer of dampening material disposed on the inner or outer sleeve surfaces so as to be in contact with the pivot-bearing cartridge or the bore surface, respectively.

According to yet another embodiment thereof, the present invention is a head stack assembly, comprising a body portion, the body portion including a bore surface that defines a through bore, an actuator arm cantilevered from the body portion, a read/write head coupled to the actuator arm, and a coil cantilevered from the body portion in an opposite direction from the actuator arm, a pivot-bearing cartridge configured to fit over a post and within the through bore for pivotally supporting the head stack assembly, a tolerance ring coupled to the pivot-bearing cartridge and configured to couple to the post. The tolerance ring includes a single sleeve defining an inner sleeve surface that is configured to face the post and an outer sleeve surface facing the pivot-bearing cartridge, and a layer of dampening material disposed on the inner or outer sleeve surfaces of the sleeve so as to be in contact with the post when coupled to the post or the pivot-bearing cartridge, respectively.

DESCRIPTION OF PREFERRED EMBODIMENTS

Figure 1:
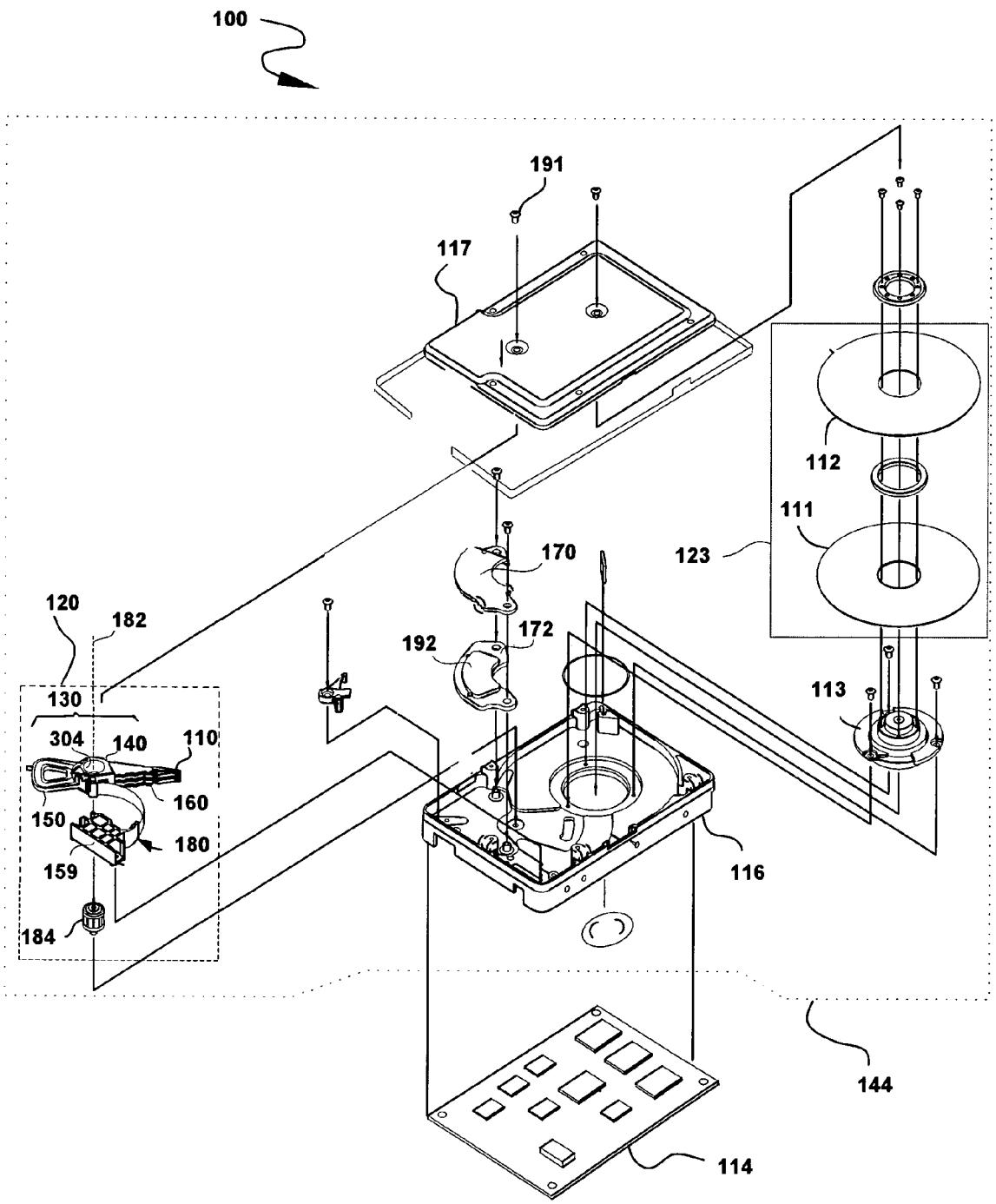
FIG. 1 is an exploded view of a disk drive according to an embodiment of the present invention.

FIG. 1 shows the principal components of a magnetic disk drive 100 constructed in accordance with the present invention. With reference to FIG. 1, the disk drive 100 comprises a HDA 144 and a PCBA 114. The HDA 144 includes a disk drive enclosure comprising base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot-bearing cartridge 184 that rotatably supports the HSA 120 on the base 116. The spindle motor 113 rotates the disk stack 123 at a constant angular velocity. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The body portion 140 includes a bore surface 304 that defines a through bore. The actuator arm 160 supports the HGA 110 that, in turn, supports the slider(s). The flex cable assembly 180 may include a flex circuit cable and a flex clamp 159. According to the present invention and as detailed below, a tolerance ring 200 is coupled to the pivot-bearing cartridge 184 that engages the through bore defined in the actuator body portion 140 to pivotally secure the HSA 120 to the base 116 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot-bearing 184 cartridge between limited positions, a coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112.

Figure 2:
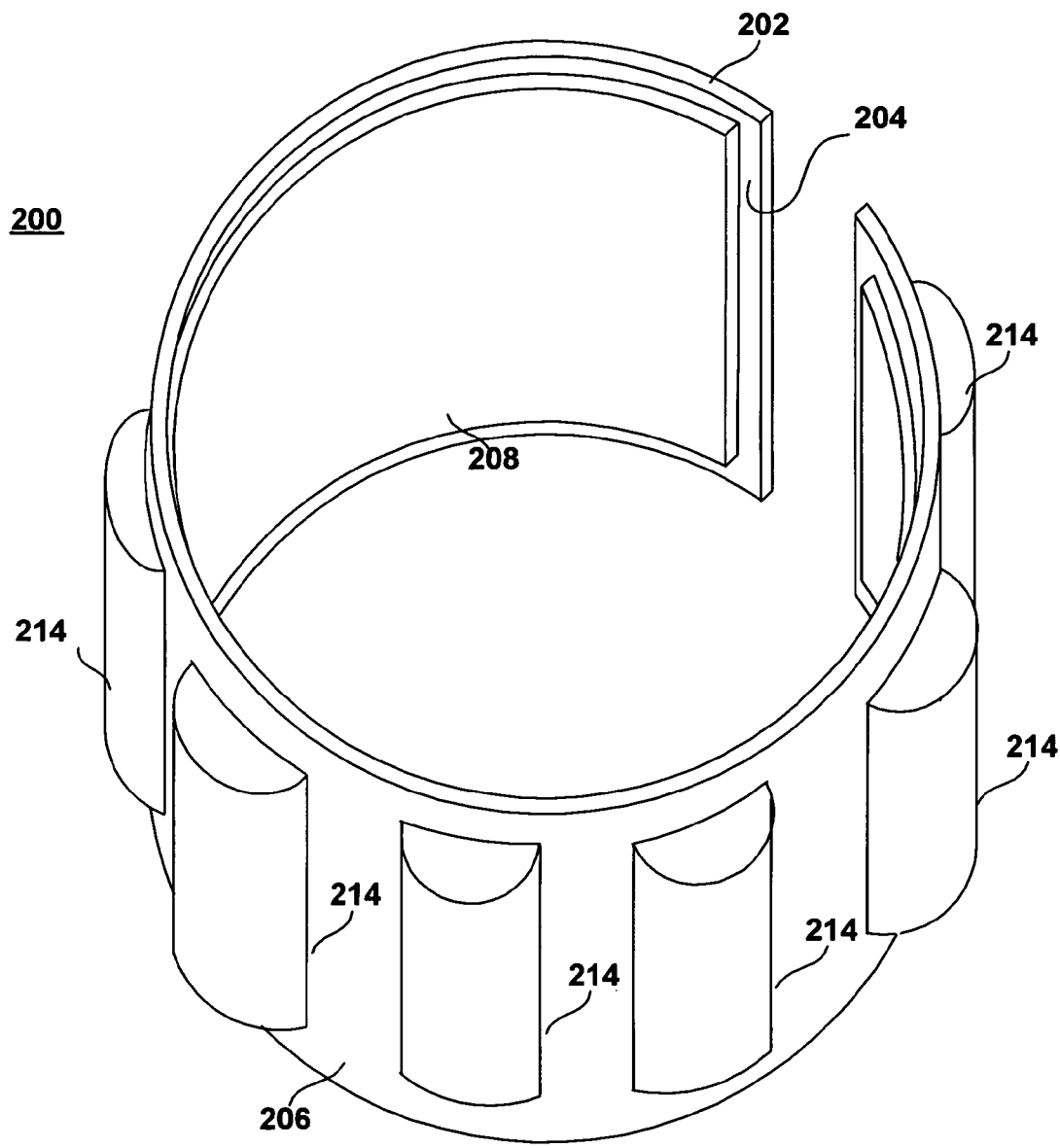
FIG. 2 is a perspective view of an embodiment of a tolerance ring according to the present invention.

FIG. 2 shows a perspective view of an embodiment of a tolerance ring 200 according to the present invention. As shown, the tolerance rings 200 may be shaped as a right cylindrical open ring. The tolerance ring 200 also includes a layer of dampening material 208 on either the inner surface 204 or the outer surface 206 thereof. In exemplary FIG. 2, the layer of dampening material 208 is shown to be in contact with the inner surface 204 of the single sleeve 202. Although not shown in FIG. 2, the present invention also provides for the layer of dampening layer 208 to be in contact with the outer surface 206 of the single sleeve 202. The tolerance ring 200 may be manufactured by providing a sheet of sheet metal (for example), and applying the layer of dampening material 208 thereon. The layer of dampening material 208 may then be allowed to cure, dry, solidify or otherwise stabilize. Thereafter, the sheet of sheet metal with the dampening material 208 applied thereon may be cut to the required dimensions of the ring 200, which dimensions should enable the tolerance ring 200 to fit onto the exterior surface of the pivot-bearing cartridge 184. The cut sheet metal may then be shaped into the ring shape of FIG. 2, with the layer of dampening material 208 on the inner surface 204 or the outer surface 206 thereof. The indentations 214 may be formed during the process of shaping the tolerance ring 200, by gears applying force (using gears, for example) to the ring 200 and locally deforming the sheet metal so as to cause it to curl onto itself to form the ring shape shown in FIG. 2. As shown, these local deformations cause convex features on the exterior surface 206 of the ring 200 and the corresponding concave features on the interior surface 204 thereof.

Figure 3:
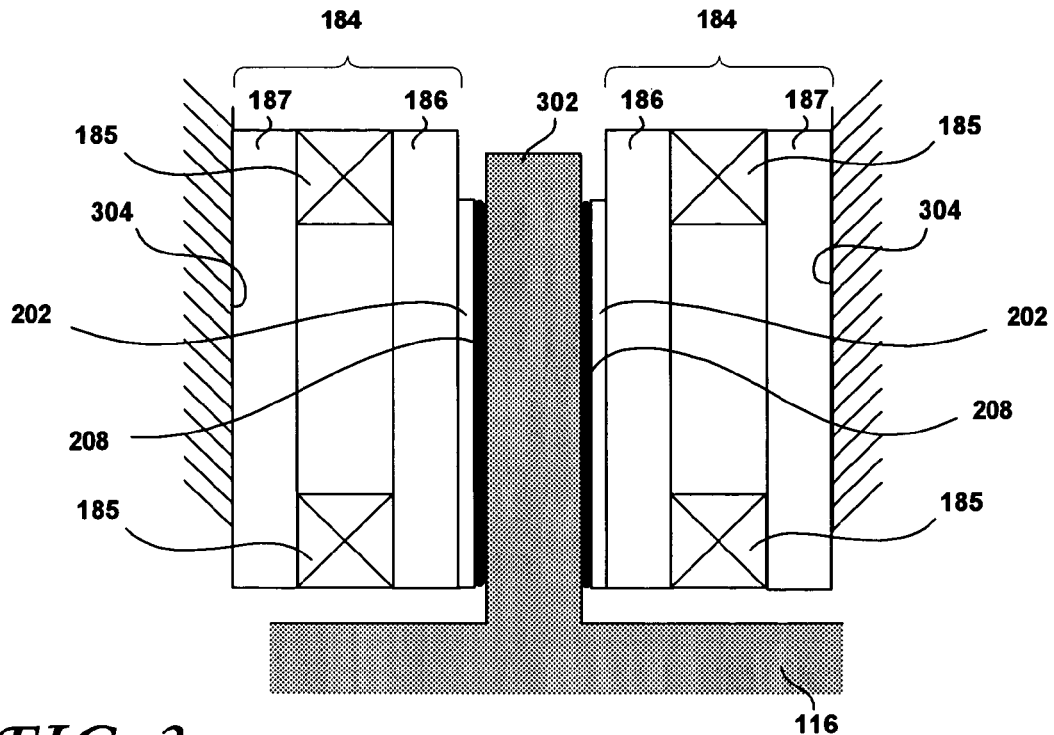
FIG. 3 is a cross-sectional view showing the pivot-bearing cartridge and a portion of the body portion of the actuator assembly, according to an embodiment of the present invention.
Figure 4:
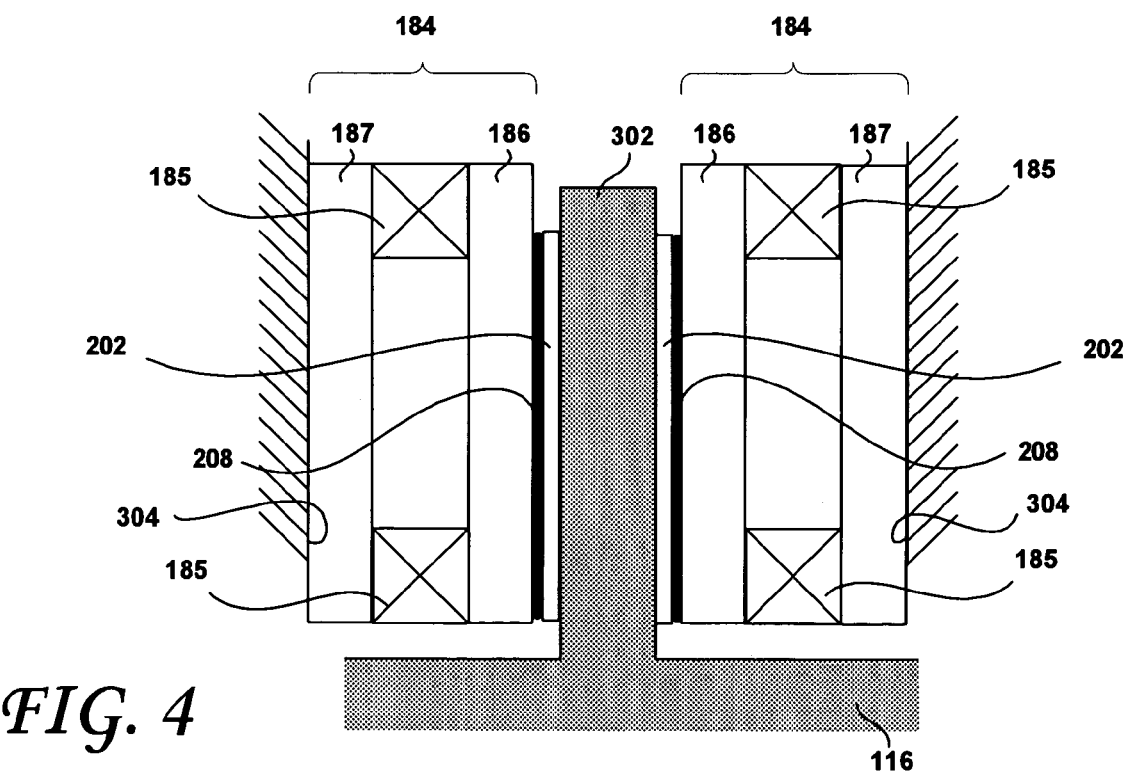
FIG. 4 is a cross-sectional view showing the pivot-bearing cartridge and a portion of the body portion of the actuator assembly, according to another embodiment of the present invention.

FIGS. 3 and 4 are cross-sectional views of embodiments of the present invention. FIGS. 3 and 4 show, in cross-section, the pivot-bearing cartridge 184, a post 302 and the bore surface 304 of the through bore of the actuator body portion 140. The post 302 extends from the base 116 and constitutes a stationary feature to which the pivot-bearing 184 attaches and pivots. The pivot-bearing cartridge 184, therefore, is configured to be press-fitted over and pivot about the post 302. In turn, the rotary actuator assembly 130 is configured to be press-fitted over the pivot-bearing cartridge 184. According to the embodiment of the present invention shown in FIG. 3, a tolerance ring 200 may be interposed between the post 302 and the pivot-bearing cartridge 184. The pivot-bearing cartridge 184 includes an inner portion 186 close to the post 302 and an outer portion 187 close to the bore surface 304. Bearings 185 enable the outer portion 187 of the pivot-bearing cartridge 184 to rotate relative to the inner portion 186 thereof.

As shown, the tolerance ring 200 includes a single sleeve 202 that defines an inner sleeve surface 204 facing the pivot-bearing cartridge 184 and an outer sleeve surface 206 facing away from the pivot-bearing cartridge 184 (see FIG. 2). The tolerance ring 200 also includes a layer of dampening material 208 disposed on either the inner sleeve surface 204 or the outer sleeve surface 206. When the layer of dampening material 208 is disposed on the inner sleeve surface 204, as shown in FIG. 3, the layer of dampening material 208 is in contact with post 302. As shown in FIG. 4, when the layer of dampening material 208 is disposed on the outer sleeve surface 206, the layer of dampening material 208 is contact with the inner portion 186 of the pivot-bearing cartridge 184. According to the present invention, to prevent the layer of dampening material 208 from being damaged during assembly, the tolerance ring 200 is preferably mounted to the post 302 before the pivot-bearing assembly 184 is press-fitted to the tolerance ring 200. Thereafter, the actuator assembly 130 may be press-fitted onto the pivot-bearing assembly 184. In this manner, when any two components are press-fitted to one another, there is only metal-to-metal contact and not metal to dampening layer contact.

Figure 5:
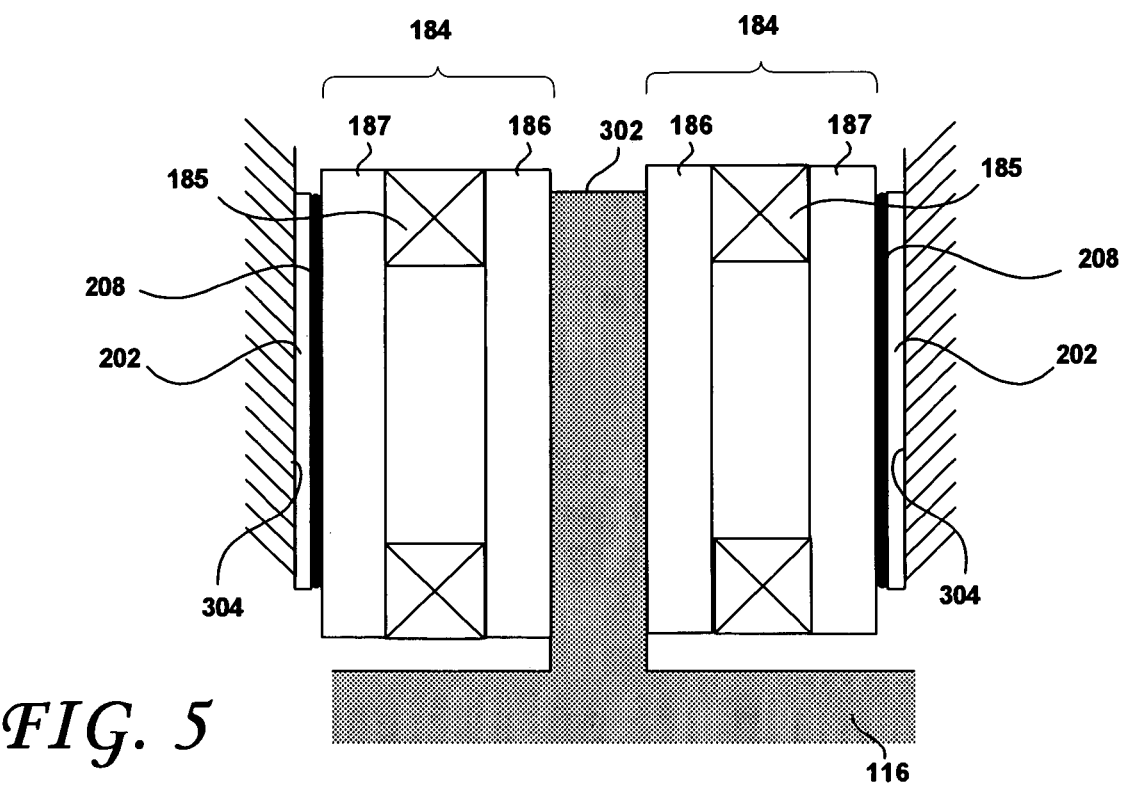
FIG. 5 is a cross-sectional view showing the pivot-bearing cartridge and a portion of the body portion of the actuator assembly, according to still another embodiment of the present invention.
Figure 6:
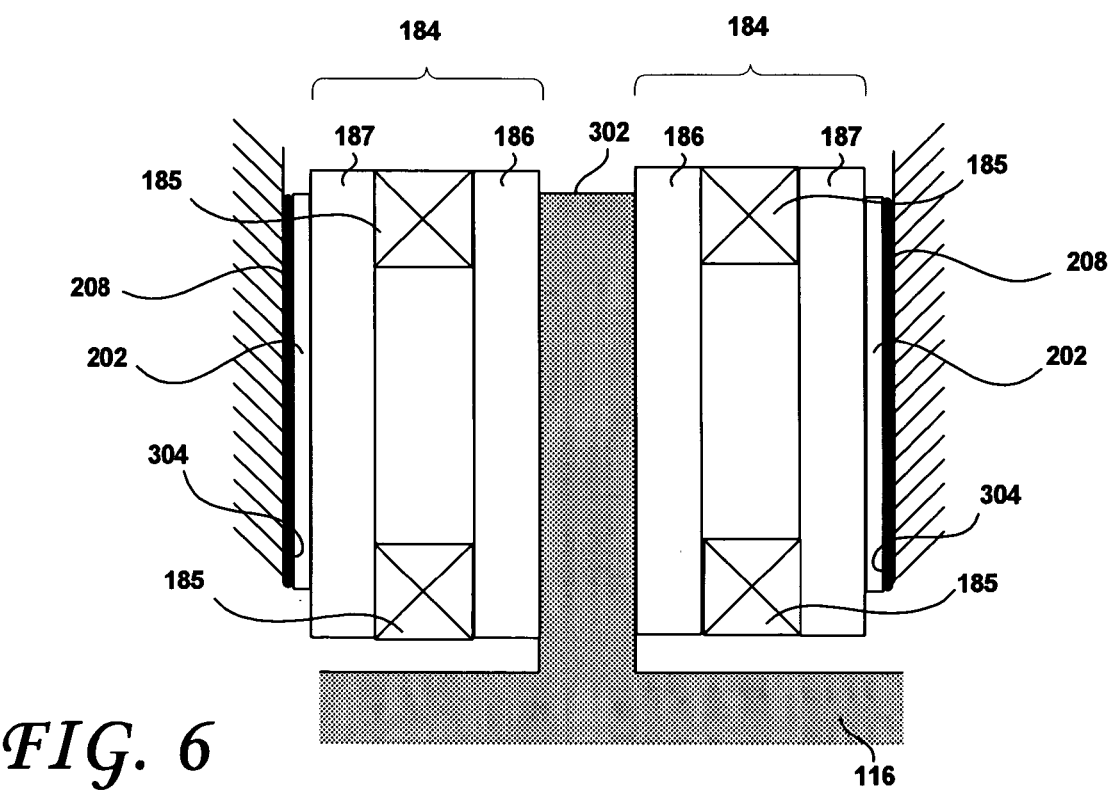
FIG. 6 is a cross-sectional view showing the pivot-bearing cartridge and a portion of the body portion of the actuator assembly, according to yet another embodiment of the present invention.

FIGS. 5 and 6 depict additional embodiments of the present invention. FIGS. 5 and 6 are identical to FIGS. 3 and 4, but for the emplacement of the tolerance ring 200. As shown in FIGS. 5 and 6, the tolerance ring 200 may be coupled between the outer portion 187 of the pivot-bearing cartridge 184 and the bore surface 304. As particularly shown in FIG. 5, the single sleeve 202 of the tolerance ring 200 includes an inner sleeve surface facing post 302 and an outer sleeve surface facing the bore surface 304. In the embodiment of FIG. 5, the layer of dampening material 208 is disposed on the inner sleeve surface 204 so as to be in contact with the outer portion 187 of the pivot-bearing cartridge 184. In the embodiment of FIG. 6, the layer of dampening material 208 is disposed on the outer sleeve surface 206 so as to be in contact with the bore surface 304. During assembly, the pivot-bearing cartridge 184 may be press-fitted to the post 302. Thereafter, the tolerance ring 200 may be coupled to the external surface of the pivot-bearing cartridge. The actuator assembly may then be press-fitted onto the tolerance ring 200 such that there is metal-to-metal contact between the bore surface 304 and the outer surface 206 of the tolerance ring 200 during the press-fitting procedure.

Figure 7:
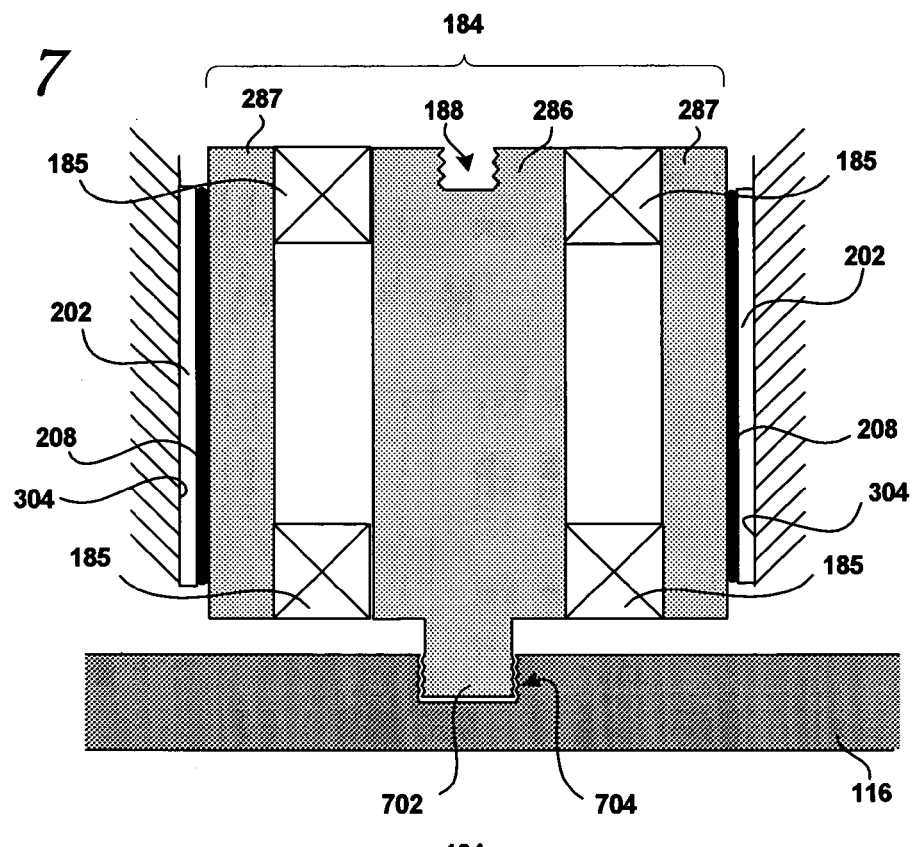
FIG. 7 is a cross-sectional view showing the pivot-bearing cartridge and a portion of the body portion of the actuator assembly, according to a further embodiment of the present invention.
Figure 8:
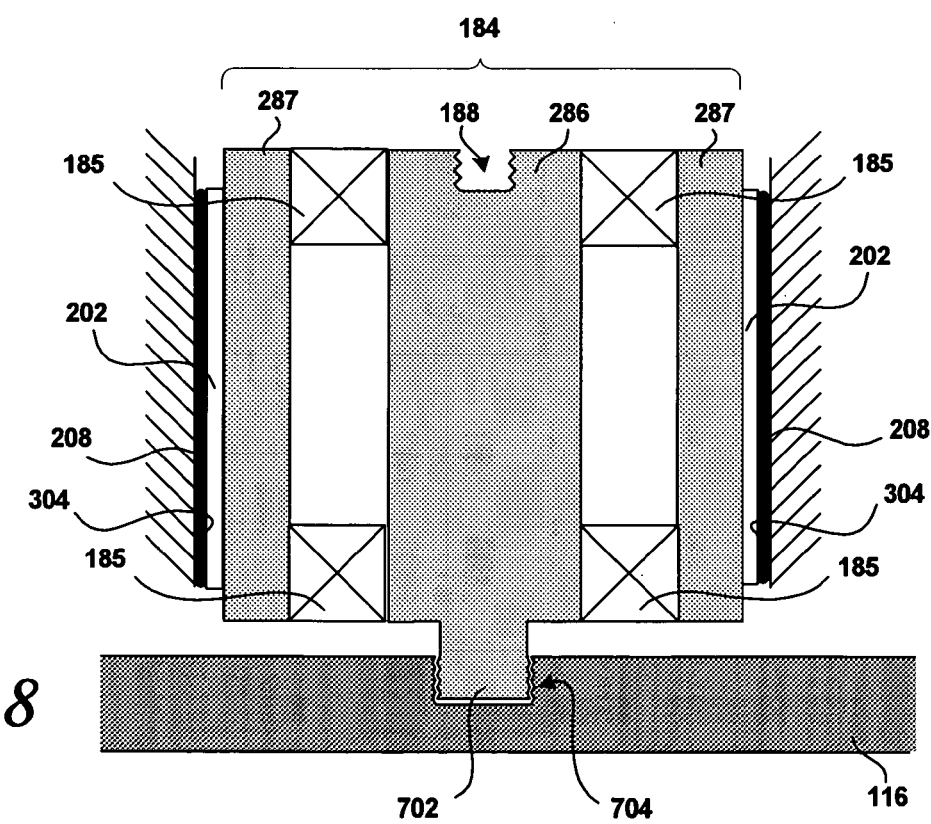
FIG. 8 is a cross-sectional view showing the pivot-bearing cartridge and a portion of the body portion of the actuator assembly, according to another embodiment of the present invention.

FIGS. 7 and 8 show further embodiments of the present invention. FIGS. 7 and 8 illustrate the case wherein the disk drive does not include a post 302 extending from the base 116. As shown, the pivot-bearing cartridge 184 includes a screw-like projection 702 and the base 116 includes a corresponding threaded bore 704 that is configured to mate with the projection 702 of the pivot-bearing cartridge 184. The pivot-bearing cartridge 184 also includes a threaded bore 188 through which a screw (referenced at numeral 191 in FIG. 1) may be inserted through the cover 117 to further secure and stabilize the pivot-bearing cartridge 184 within the drive enclosure. The pivot-bearing cartridge 184, in this embodiment, includes an inner portion 286 and an outer portion 287. Bearings 185 are disposed between the inner and outer portions 286, 287 to allow the inner and outer portions 286, 287 to rotate relative to one another. In the embodiments shown in FIGS. 7 and 8, the tolerance ring 200 is disposed between the outer portion of the pivot-bearing cartridge 184 and the bore surface 304 of the body portion 140 of the rotary actuator assembly 130. In particular, tolerance ring 200 of FIGS. 7 and 8 includes a single sleeve 202 and a layer of dampening material 208. In the embodiment shown in FIG. 7, the layer of dampening material 208 is disposed on the inner surface 204 of the sleeve 202 and is in contact with the outer portion 287 of the pivot-bearing cartridge 184. In the embodiment shown in FIG. 8, the layer of dampening material 208 is disposed on the outer surface 206 of the sleeve 202 and is in contact with the bore surface 304. During assembly, the pivot-bearing cartridge 184 may be secured to the base 116 by engaging the screw-like projection 702 into the threaded bore 704. Thereafter, the tolerance ring 200 may be fitted against the bore surface 304 within the through bore of the body portion 130 of the actuator assembly 130. The assembly including the tolerance ring 200 and the actuator assembly 130 may then be press-fitted onto the pivot-bearing cartridge 184 such that there is metal-to-metal contact between the single sleeve 202 of the tolerance ring 200 and the outer surface of the pivot-bearing cartridge 184 during the press-fitting procedure.

The dampening layer 208 should be a non-outgassing material having suitable damping characteristics (i.e., having dampening characteristics that are effective to dampen unwanted resonances such as, for example, the butterfly mode resonance, the pivot rocking mode or the pivot pitch mode. The dampening layer 208 should also exhibit thermal stability at the range of temperatures at which the disk drive is designed to operate and should be resistant to wear and tear (e.g., shearing during the press-fitting process) during manufacturing of the disk drive. For example, the dampening layer 208 may be or include an adhesive layer manufactured by, for example, 3M Corporation.

Advantageously, the present invention reduces the actuator butterfly mode resonance amplitude. Drives incorporating the present invention require a less powerful servo notch filter to handle the damped resonance peak, which may lead to higher servo bandwidth. Moreover, the present tolerance ring 200 is easily manufacturable, without fear of deforming or extruding the dampening layer 202 during press-fitting operations or delamination during manufacture of the tolerance ring.

We claim:

1. A head stack assembly, comprising:
   a body portion, the body portion including a bore surface that defines a through bore;
   an actuator arm cantilevered from the body portion;
   a read/write head coupled to the actuator arm;
   a coil cantilevered from the body portion in an opposite direction from the actuator arm;
   a pivot-bearing cartridge configured to fit within the through bore for pivotally supporting the head stack assembly on a base, the pivot-bearing cartridge including an inner portion and an outer portion, the inner and outer portions being separated by upper and lower bearings, the outer portion including an outer surface that faces the bore surface, and a tolerance ring disposed between the outer surface of the pivot-bearing cartridge and the bore surface, the tolerance ring including:

a single sleeve defining an inner sleeve surface facing the pivot-bearing cartridge and an outer sleeve surface facing away from the pivot-bearing cartridge, and a layer of dampening material disposed on one of the inner and outer sleeve surfaces so as to encircle the pivot-bearing cartridge over most of its periphery and so as to be in contact with one of the outer surface of the pivot-bearing cartridge and the bore surface, respectively.

2. The head stack assembly of claim 1, wherein the tolerance ring is configured as a right-cylindrical open ring.

3. A disk drive, comprising:

a base;

a disk;

a spindle motor attached to the base for rotating the disk, and a head stack assembly pivotally coupled to the base, comprising:

a body portion, the body portion including a bore surface that defines a through bore;

an actuator arm cantilevered from the body portion;

a head for reading from and writing to the disk coupled to the actuator arm, and a coil cantilevered from the body portion in an opposite direction from the actuator arm;

a pivot-bearing cartridge configured to fit within the through bore for pivotally supporting the head stack assembly on the base, the pivot-bearing cartridge including an inner portion and an outer portion, the inner and outer portions being separated by upper and lower bearings, the outer portion including an outer surface that faces the bore surface, and a tolerance ring disposed between the outer surface of the pivot-bearing cartridge and the bore surface, the tolerance ring including:

a single sleeve defining an inner sleeve surface facing the pivot-bearing cartridge and an outer sleeve surface facing away from the pivot-bearing cartridge, and a layer of dampening material disposed on one of the inner and outer sleeve surfaces so as to encircle the pivot-bearing cartridge over most of its periphery and so as to be in contact with one of the outer surface of the pivot-bearing cartridge and the bore surface, respectively.

4. The disk drive of claim 3, wherein the tolerance ring is configured as a right-cylindrical open ring.

* * * * *